United States Patent
Cravener et al.

(10) Patent No.: US 10,450,059 B2
(45) Date of Patent: Oct. 22, 2019

(54) MULTI-PIECE INBOARD-BEAM

(71) Applicant: Bell Helicopter Textron Inc., Fort Worth, TX (US)

(72) Inventors: Kyle Thomas Cravener, Watauga, TX (US); Tyler Wayne Baldwin, Keller, TX (US); Nicholas Allen Torske, Lewisville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 15/882,573

(22) Filed: Jan. 29, 2018

(65) Prior Publication Data

US 2019/0233097 A1    Aug. 1, 2019

(51) Int. Cl.

| | | |
|---|---|---|
| *B64C 27/33* | (2006.01) | |
| *B64C 27/35* | (2006.01) | |
| *B64C 27/48* | (2006.01) | |
| *B64C 27/32* | (2006.01) | |
| *B64C 27/50* | (2006.01) | |
| *B64C 29/00* | (2006.01) | |

(52) U.S. Cl.
CPC .............. *B64C 27/33* (2013.01); *B64C 27/50* (2013.01); *B64C 29/0033* (2013.01)

(58) Field of Classification Search
CPC ......... B64C 27/32; B64C 27/33; B64C 27/35; B64C 27/48; B64C 27/50
See application file for complete search history.

(56) References Cited

U.S. PATENT DOCUMENTS

| | | | | |
|---|---|---|---|---|
| 4,585,393 | A * | 4/1986 | Hibyan | B64C 27/35 416/134 A |
| 5,059,094 | A * | 10/1991 | Robinson | B64C 27/33 416/134 A |
| 5,110,259 | A * | 5/1992 | Robinson | F16F 1/393 144/144.1 |
| 5,636,970 | A * | 6/1997 | Certain | B64C 27/51 416/106 |
| 2016/0311178 | A1 * | 10/2016 | Cole | B29C 53/043 |

* cited by examiner

*Primary Examiner* — Nathaniel E Wiehe
*Assistant Examiner* — Michael K. Reitz
(74) *Attorney, Agent, or Firm* — Winstead PC

(57) ABSTRACT

A multi-piece inboard beam assembly for use in a rotor blade assembly of a rotorcraft. The inboard beam assembly includes an inboard beam connected to an inboard beam fitting with an anti-rotational connection. The inboard beam is connected to a yoke via bearings and the inboard beam fitting is connected to a grip in a double shear condition. In use, the grip, the inboard beam fitting with the double shear connection, the inboard beam, a centrifugal force bearing held by the inboard beam, and the yoke carry the centrifugal force created upon rotation of the rotor blade assembly.

20 Claims, 10 Drawing Sheets

MULTI-PIECE INBOARD-BEAM

BACKGROUND

This section provides background information to facilitate a better understanding of the various aspects of the disclosure. It should be understood that the statements in this section of this document are to be read in this light, and not as admissions of prior art.

Rotor systems of rotorcraft and tiltrotor aircraft include a yoke connected to a drive mast driven by a power source. The yoke transfers the torque provided by the power source to rotor blades. The yoke is connected to the rotor blades with inboard and outboard beam assemblies via a grip. Depending on aircraft configuration, the yoke may be manufactured of steel for strength or composite material for weight savings. The grip is typically manufactured of composite material. The inboard and outboard beam assemblies include bearings that accommodate forces acting on the rotor blades allowing each rotor blade to flex with respect to the yoke/mast and other rotor blades. A particular distance between the inboard and outboard beam assemblies is dependent on the aircraft configuration where each configuration has an optimal distance for that particular aircraft's loads and dynamics. Typically, the outboard beam assembly includes a centrifugal force ("CF") bearing and a shear bearing connected to both the rotor blade and a tip of a yoke arm via the grip while the inboard beam assembly includes a shear bearing connected to both the rotor blade and the yoke in a cut-out proximate the drive mast also via the grip. CF loads can be significantly greater than shear loads. If an aircraft configuration repositions the CF bearing to the inboard beam assembly, the connection between the inboard beam assembly and the grip that typically carries only shear forces provides a possible failure point because of the greater CF loads it now carries.

SUMMARY

An example of an inboard bearing assembly for a rotorcraft includes an inboard beam including a post, a beam fitting, including an outer plate aligned with an inner plate, engaged with the post, the beam fitting connected to the inboard beam at an anti-rotational connection, where the inboard beam is prevented from rotation around a central longitudinal axis of the inboard beam relative to the beam fitting, and the beam fitting connected to a composite grip between the outer plate and the inner plate.

An example of a rotor blade assembly for a rotorcraft includes a metal yoke including a central aperture, a drive shaft connected to the metal yoke at the central aperture, a metal yoke arm, formed by the metal yoke, extending radially from the central aperture, a beam fitting connected to an inboard beam at an anti-rotational connection, a centrifugal force ("CF") bearing held by the metal yoke arm and the inboard beam, a grip connected to the beam fitting at a double shear connection, and a CF load path of the rotor blade assembly through the grip, the beam fitting, the inboard beam, the CF bearing, the metal yoke.

An example of an inboard bearing assembly for a rotorcraft includes an inboard beam, a post extending from the inboard beam, a beam fitting, including an outer plate aligned with an inner plate, engaged with the post, the beam fitting connected to the inboard beam at an anti-rotational connection, where the inboard beam is prevented from rotation around a central longitudinal axis of the inboard beam relative to the beam fitting, the beam fitting connected to a grip between the outer plate and the inner plate, where the post is positioned in a slot formed in the grip, a shaft extending from the inboard beam opposite a curved surface in the inboard beam, a spindle bearing attached to the shaft, a centrifugal force ("CF") bearing held by the curved surface, and a CF load path through the grip, the beam fitting, the inboard beam, and the CF bearing.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
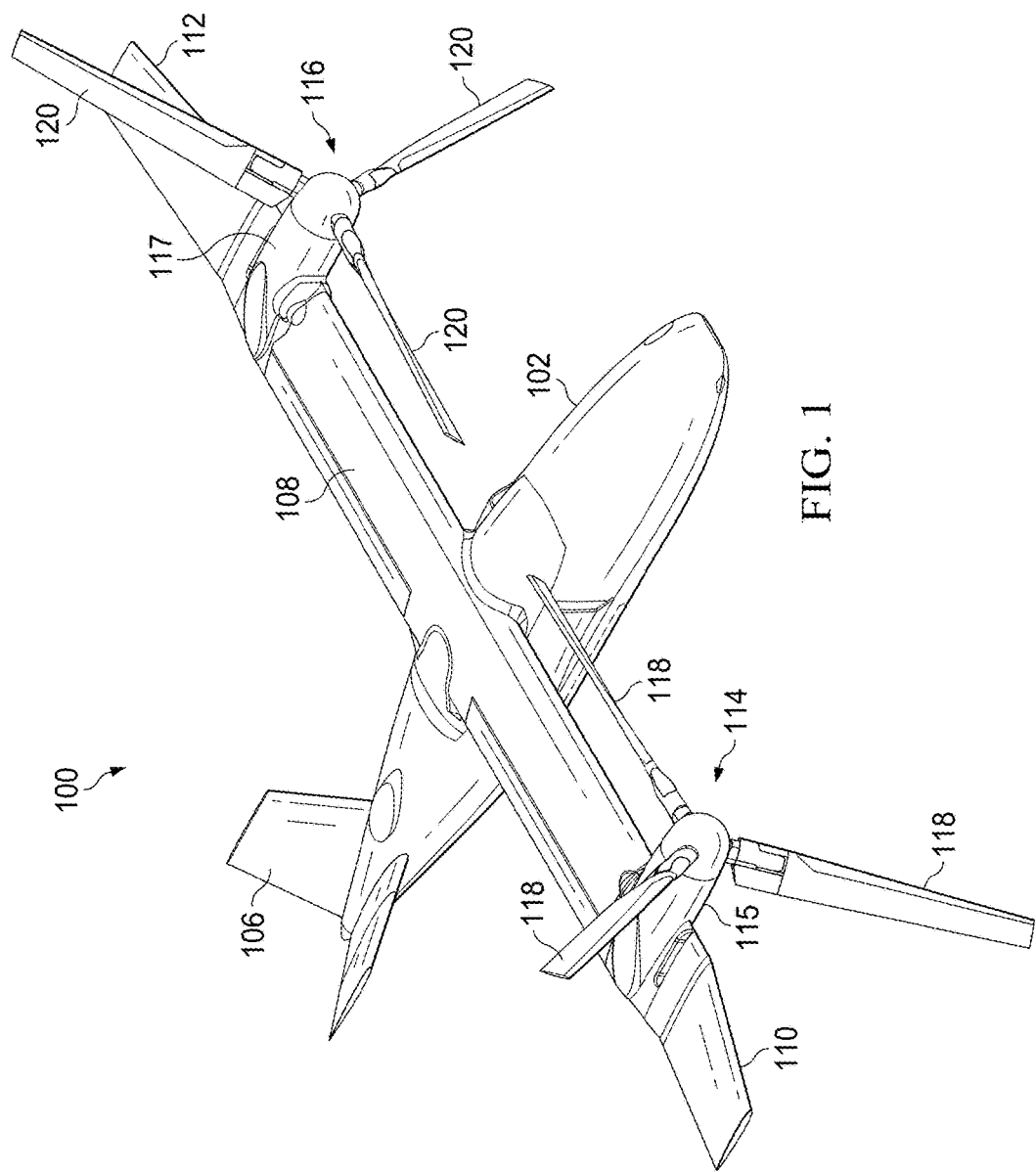
FIG. 1 is a perspective view of a tiltrotor aircraft in a flight ready position according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Referring to FIG. 1, an illustrative tiltrotor aircraft 100 is shown. Tiltrotor aircraft 100 includes fuselage 102, tail member 106, wing 108, wing tip 110, wing tip 112, rotor system 114, and rotor system 116. Rotor system 114 is connected to nacelle 115 located on an end portion of wing 108 proximate wing tip 110, while rotor system 116 is connected to nacelle 117 located on an opposite end portion of wing 108 proximate wing tip 112. Wing tip 110 is pivotable at a location on wing 108 outboard of nacelle 115. Wing tip 112 is pivotable at a location on wing 108 outboard of nacelle 117. Nacelles 115 and 117 are pivotable between a helicopter mode where the rotor systems are generally vertical and an airplane mode where the rotor systems are generally horizontal. Nacelle 115 and nacelle 117 are substantially symmetric of each other about fuselage 102. Rotor system 114 includes a plurality of foldable rotor blades 118. Rotor system 116 includes a plurality of foldable rotor blades 120. Rotor blades 118 and 120 may rotate in opposite directions to cancel the torque associated with the operation of each rotor system 114 and 116. The angle of the pivotable nacelles 115 and 117 relative to the wing, as well as the pitch of rotor blades 118 and 120, can be adjusted in order to selectively control direction, thrust, and lift of tiltrotor aircraft 100.

Fuselage 102 represents the body of tiltrotor aircraft 100 and may be coupled to rotor systems 114 and 116 such that the rotor systems with rotor blades 118 and 120 may move tiltrotor aircraft 100 through the air. Landing gear supports tiltrotor aircraft 100 when tiltrotor aircraft 100 is landing or when tiltrotor aircraft 100 is at rest on the ground. Further, rotor systems 114 and 116 are illustrated in the context of tiltrotor aircraft 100; however, a singular rotor system with foldable or non-foldable rotor blades can be implemented on other non-tilting rotor and helicopter rotor systems. It should also be appreciated that teachings from tiltrotor aircraft 100 may apply to other aircraft such as airplanes and unmanned aircraft which employ rotor systems.

Generally each rotor system includes a drive mast driven by a power source. A rotor system includes a yoke connected to the drive mast with a hub and rotor blades indirectly connected to the yoke with inboard and outboard beam assemblies via a grip. The beam assemblies include bearings that accommodate forces acting on the rotor blades allowing each rotor blade to flex with respect to the yoke/mast and other rotor blades. The weight of the rotor blades and the lift of rotor blades may result in transverse forces on the yoke and other components. Examples of transverse forces may include forces resulting from flapping and coning of the rotor blades. Flapping generally refers to the gimbaling motion of the hub that connects the yoke to the mast. Coning generally refers to the upward flexing of a rotor blade due to lift forces acting on the rotor blade. The rotor blades may be subject to other forces, such as axial, lead/lag, and feathering forces. Axial forces generally refer to the centrifugal force on the rotor blades during rotation of the rotor blades. Lead and lag forces generally refer to forces resulting from the horizontal movement of the rotor blades about a vertical pin occurring if, for example, the rotor blades do not rotate at the same rate as the yoke. Feathering forces generally refer to forces resulting from twisting motions that cause a rotor blade to change pitch. The power source, drive mast, and yoke are components for transmitting torque. The power source may include a variety of components including an engine, a transmission, and differentials. In operation, the drive mast receives torque from the power source and rotates the yoke. Rotation of the yoke causes the rotor blades to rotate with the drive mast and yoke.

Figure 2:
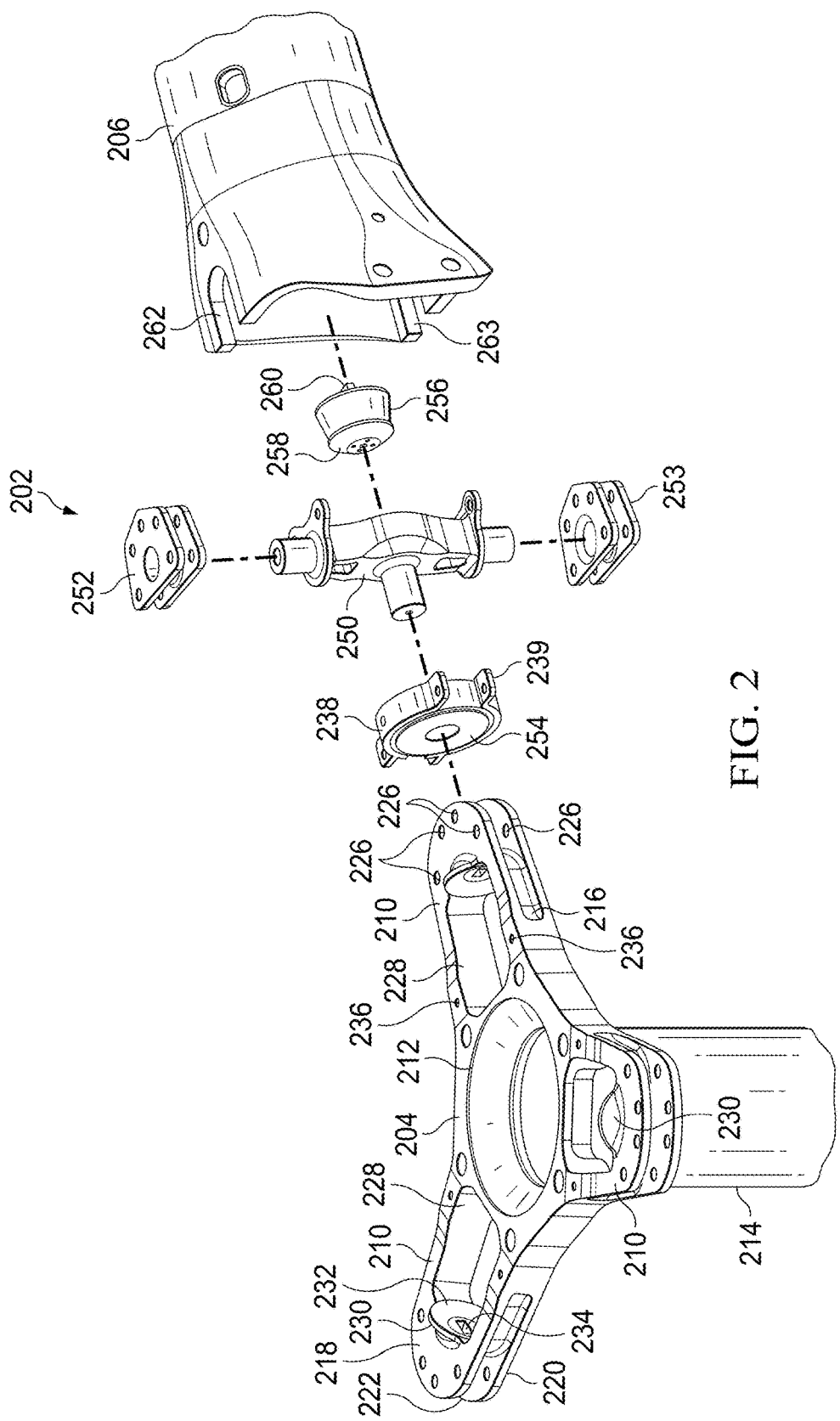
FIG. 2 is an exploded perspective view of a yoke, an inboard beam assembly, and a grip according to aspects of the disclosure.
Figure 3:
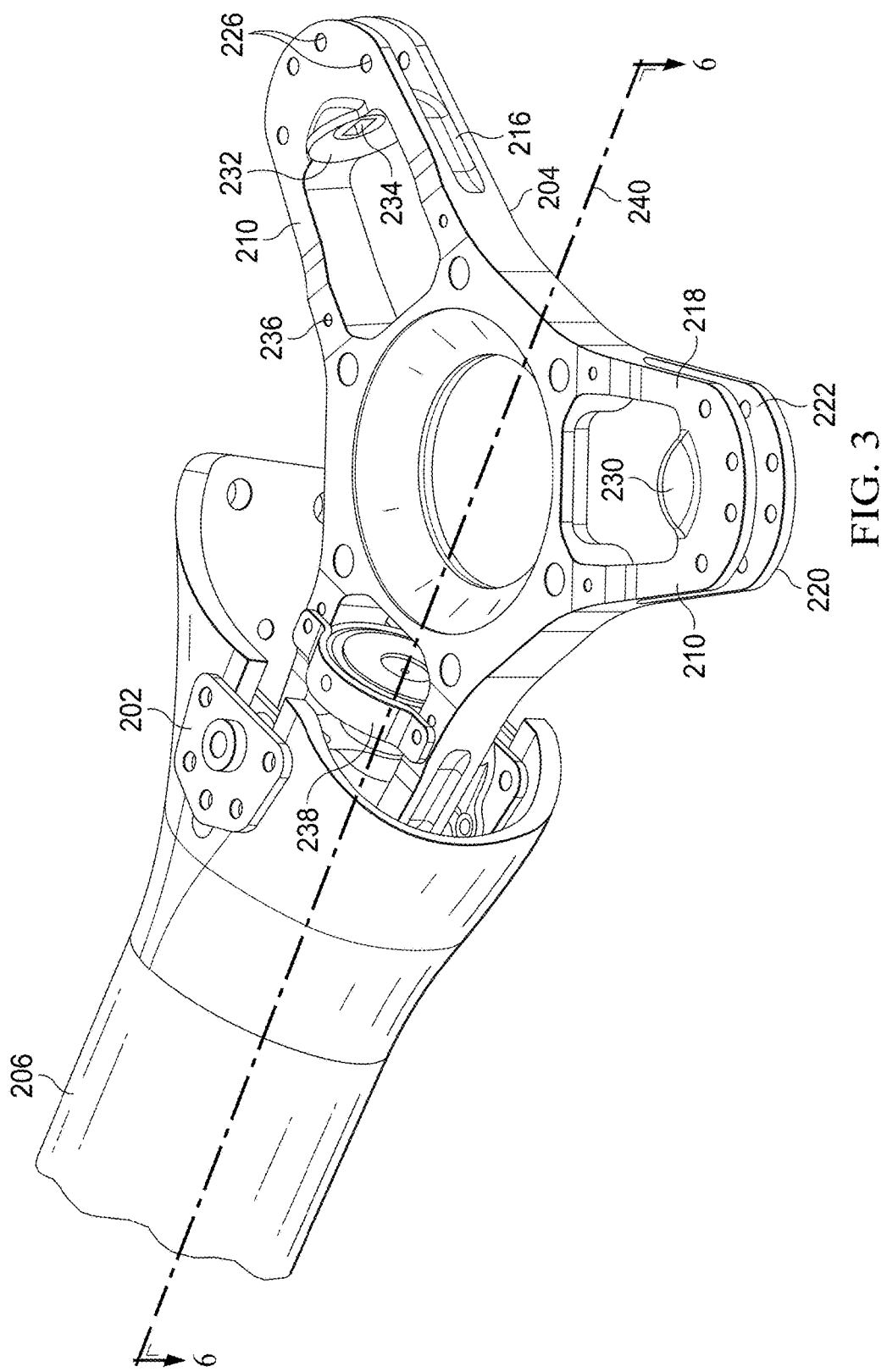
FIG. 3 is a perspective view of an inboard beam assembly mounted to a yoke and a grip according to aspects of the disclosure.

Referring to FIGS. 2 and 3, inboard beam assembly 202, yoke 204, and grip 206 are shown. Each rotor system 114, 116 includes a separate yoke. Yoke 204 includes a plurality of yoke arms 210 extending radially from central aperture 212. Each yoke arm 210 is generally equally spaced from each other around central aperture 212. For example, in the three rotor blade configuration shown, 120° separates each yoke arm. In the interest of clarity, a single inboard beam assembly is described herein with the understanding that each yoke arm includes an inboard beam assembly and a grip. It should be appreciated that teachings regarding inboard beam assembly 202 can apply to rotor systems having greater or fewer yoke arms/rotor blades.

For strength purposes, yoke 204 and inboard beam 202 are metal and may be manufactured of, for example, aluminum, steel, or titanium. Each grip 206 is manufactured of a composite material. Each grip 206 may be, for example, a composite part constructed from reinforcement material, such as fiberglass suspended in epoxy resin or a rubber compound.

Yoke 204 is connected to drive mast 214 through central aperture 212 via a hub spring assembly. Each yoke arm 210 is formed with yoke 204 such that each yoke arm 210 is a unitary portion of the yoke. Yoke arms 210 include weight pockets 216. Weight pockets 216 reduce the overall weight of yoke 204 without comprising the strength of yoke 204.

Figure 6:
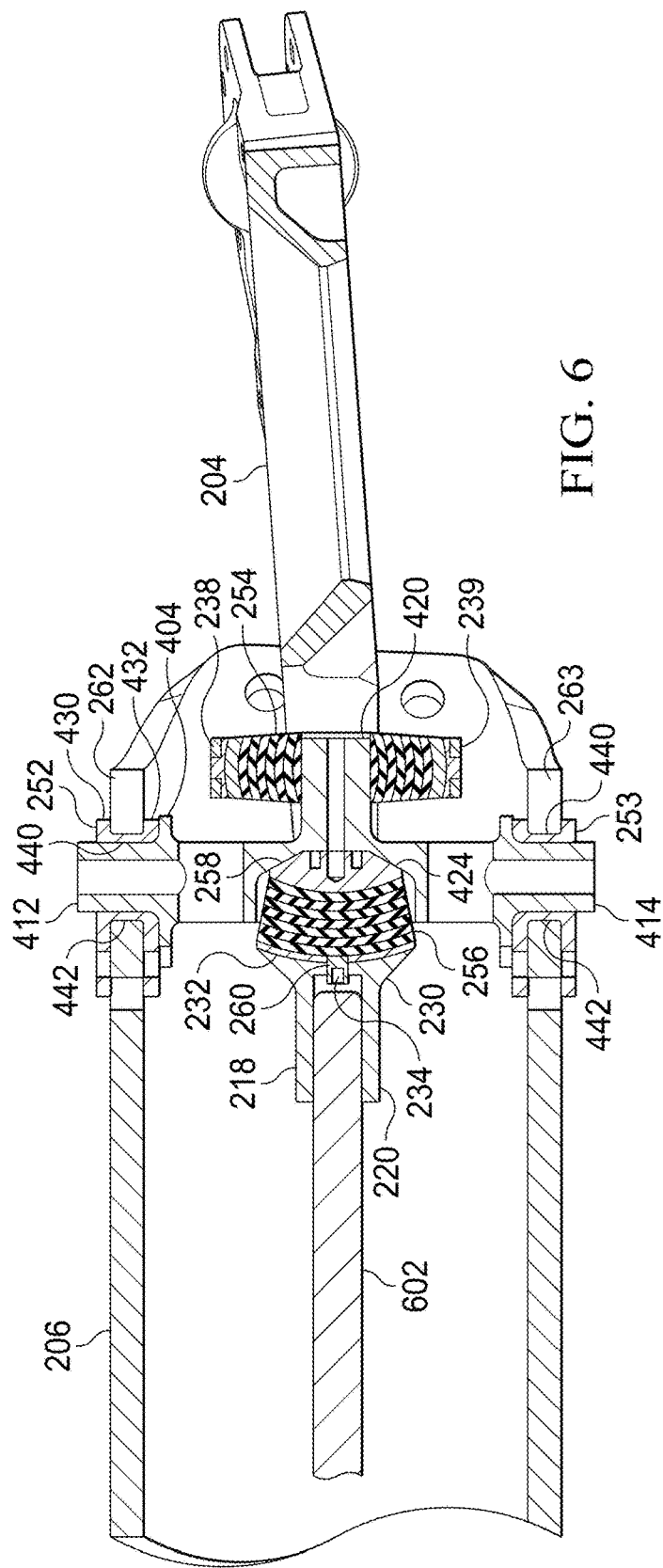
FIG. 6 is a partial sectional view of an inboard beam assembly mounted to a yoke and a grip according to one or more aspects of the disclosure taken along line 6-6 of FIG. 3.

Each yoke arm 210 includes tangs 218 and 220 that are used to connect to flexure arm 602 (FIG. 6). Each flexure arm 602 is manufactured of a flexible composite material. For flexibility, each flexure arm 602 may be, for example, a composite part constructed from reinforcement material, such as fiberglass suspended in epoxy resin or a rubber compound. Reinforcement material within flexure arm 602 can be oriented to customize how flexure arm 602 responds to certain loads. Reinforcement material can be arranged within flexure arm 306 such that it is stiff axially and laterally to resist centrifugal and lead/lag forces, however flexible vertically in a direction generally parallel with the drive mast to permit coning. Actual flexibility values provided by the constituent materials and arrangement of reinforcement layers are dependent on a particular aircraft's loads and dynamics. Flexure arm 602 further connects to the grip via an outboard beam assembly.

Tangs 218, 220 define space 222 between them. Space 222 is sized to engage flexure arm 602. Tangs 218, 220 provide a double shear connection to the flexure arm. Alternatively, flexure arm 602 may include a set of tangs sized to engage a solid yoke arm end to provide the double shear connection. Each yoke arm 210 includes mounting holes 226. Mounting holes 226 are used to connect yoke arm 210 to flexure arm 602. The connection between yoke arm 210 and the flexure arm does not carry any centrifugal force ("CF") load.

Each yoke arm 210 includes cut-out 228. Cut-out 228 extends from proximate central aperture 221 to tangs 218, 220. Cut-out 228 is sized to allow inboard beam assembly 202 to fit within cut-out 228. Cut-out 228 includes CF fitting 230. CF fitting 230 is integrally formed with yoke arm 210 within cut-out 228. CF fitting 230 may be a unitary portion of the yoke arm that has a curved surface forming a conical cavity. CF fitting 230 includes curved surface 232. Curved surface 232 is conical or parabolic shaped and includes slot 234. CF bearing 256 includes curved surface 258 opposite tab 260. Curved surface 258 engages inboard beam 250 and tab 260 is sized and shaped to engage slot 234. The engagement of tab 260 with slot 234 prevents rotation of CF bearing relative to inboard beam 250 and yoke 204 about the central longitudinal axis of CF bearing 256. As an alternative, yoke arm 210 may include a clevis that extends from CF fitting 230 and attaches to CF bearing 256 to provide the anti-rotation functionality. Each yoke arm 210 includes mounting holes 236. Mounting holes 236 are used to connect clamp plates 238, 239 to yoke arm 210. Clamp plates 238, 239 are adjacent to and hold spindle bearing 254. The CF and spindle bearings are generally elastomeric bearings constructed from a rubber type material that absorb vibration and provide for limited movement of the rotor blades relative to the yoke and drive mast.

Inboard beam assembly 202 includes inboard beam 250 and beam fittings 252, 253. Grip 206 includes slots 262, 263. Slots 262, 263 are sized to engage inboard beam assembly 202. Each rotor blade connected to yoke arm 210 shares central longitudinal axis 240 with yoke arm 210 and grip 206. The central longitudinal axis of a rotor blade may also be referred to as a blade pitch change axis.

Figure 4:
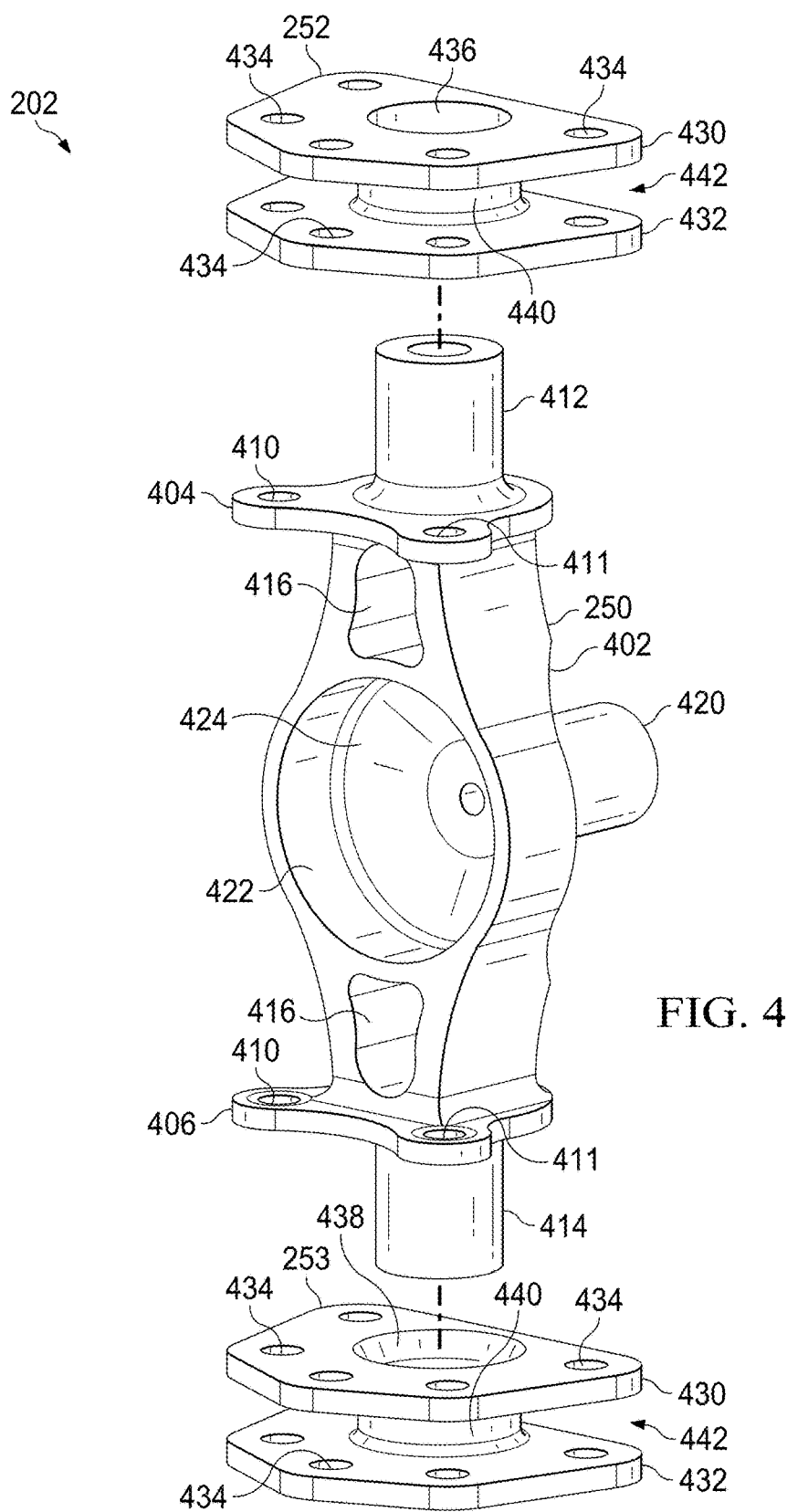
FIG. 4 is an exploded perspective view of an inboard beam assembly according to one or more aspects of the disclosure.
Figure 5:
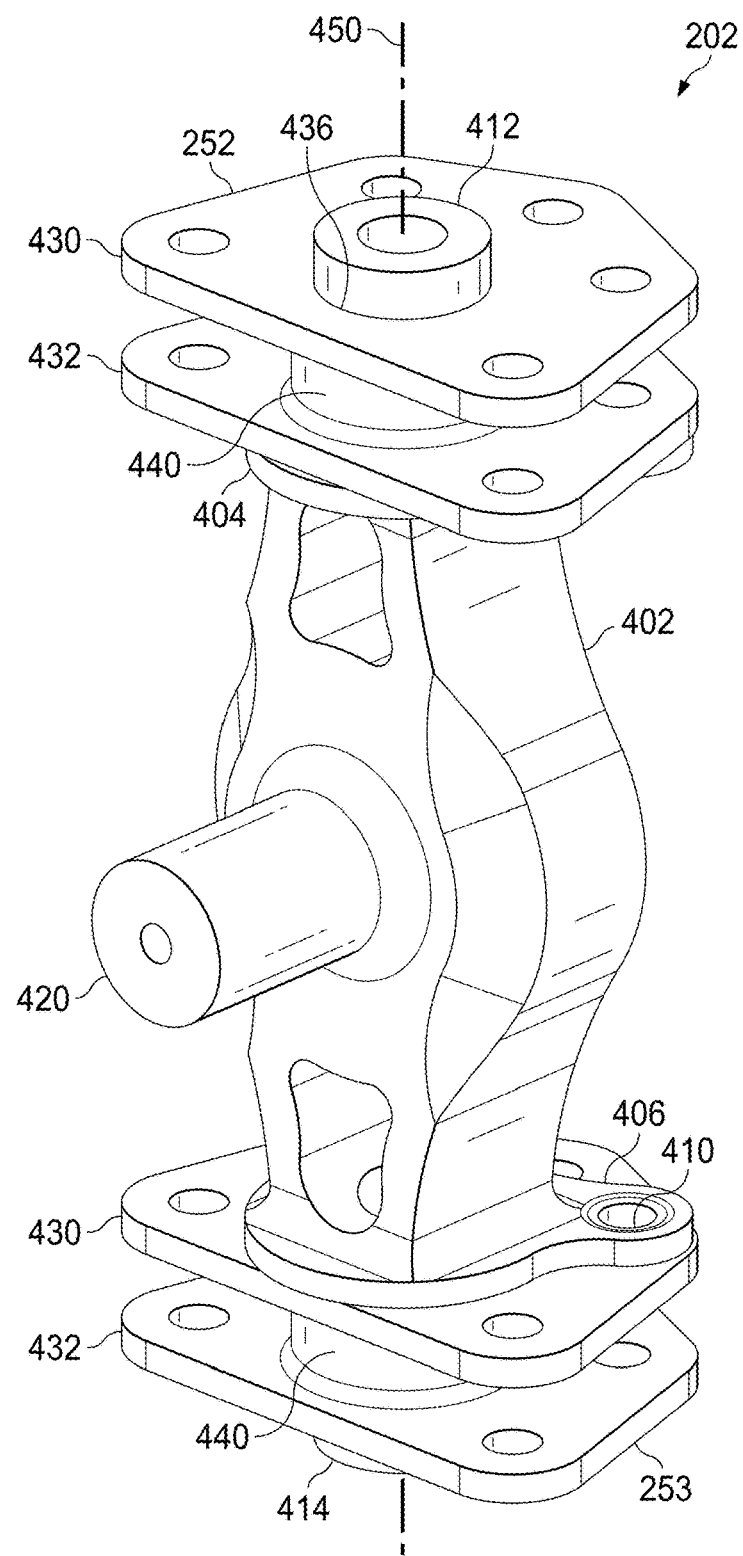
FIG. 5 is a perspective view of an inboard beam assembly according to one or more aspects of the disclosure.

FIGS. 4 and 5 illustrate inboard beam assembly 202. Inboard beam 250 includes body 402 extending between flange 404 and flange 406. Flanges 404, 406 each include mounting holes 410, 411. Mounting holes 410, 411 are used to attach inboard beam 250 to grip 206. Post 412 extends from flange 404 and post 414 extends from flange 406. Body 402 includes weight pockets 416. Weight pockets 416 reduce the overall weight of inboard beam assembly 202 without comprising the strength of inboard beam assembly 202. Inboard beam 250 includes shaft 420 extending from body 402 toward central aperture 212. Body 402 includes cavity 422 concentrically aligned with shaft 420. Cavity 422 includes curved surface 424. Curved surface 424 is conical or parabolic shaped and positioned on body 402 opposite of shaft 420. Inboard beam assembly 202 includes central axis 450.

Beam fittings 252, 253 each include outer plate 430 vertically aligned with and spaced from inner plate 432. Hub 440 connects outer plate 430 to inner plate 432. Hub 440 is a hollow cylinder. The interior of hub 440 is sized to engage posts 412, 414. The exterior of hub 440 is sized to engage slots 262, 263. Space 442 is defined between outer plate 430 and inner plate 432. Space 442 is sized to engage grip 206. Outer plate 430 and inner plate 432 include mounting holes 434. Beam fitting 252 includes post hole 436 sized to engage post 412. Beam fitting 253 includes post hole 438 sized to engage post 414. All or a portion of mounting holes 434 are generally aligned with mounting holes 410, 411 to attach beam fittings 252, 253 to body 402 and to attach inboard beam assembly 202 to grip 206. The connection to beam fittings 252, 253 through mounting holes 410, 411 prohibits rotation of inboard beam 250 relative to beam fittings 252, 253 around central axis 450 caused by shear forces acting on inboard beam assembly 202.

FIG. 6 illustrates inboard beam assembly 202 connected to flexure arm 602, grip 206, and yoke 204. Post 412 engages hub 440 and hub 440 engages slot 262. Post 414 engages hub 440 and hub 440 engages slot 263. Grip 206 occupies space 442 between outer plate 430 and inner plate 432 of beam fittings 252, 253. Mounting hardware through mounting holes 434 and 410, 411 secure beam fittings 252, 253 and inboard beam 250 to grip 206. Optionally, a locking ring (e.g. locking ring 946 in FIG. 9) threadably engaged with a post 412, 414 may engage outer plate 430 to further secure the vertical position of inboard beam 250 relative to grip 206. It is understood that inboard beam assembly 202 may be attached to grip 206 with a singular beam fitting 252 or 253 with similar success.

Flexure arm 602 is connected to yoke 204 between tangs 218, 220. CF bearing 256 is held by and between curved surface 424 of cavity 422 and curved surface 232 of CF fitting 230. The curved surfaces tend to axially center CF bearing 256 within cavity 422 and CF fitting 230 when CF bearing 256 is under compression from CF loads. It should be understood that, an axially centered CF bearing is when the central longitudinal axis of the CF bearing generally intersects the center points of curved surfaces 232 and 424. Spindle bearing 254 is attached to shaft 420, for example by vulcanization or adhesive. Clamp plates 238, 239 and shaft 420 hold or constrain spindle bearing 254. The CF load path of a rotor blade attached to grip 206 is from grip 206 to beam fittings 252, 253, to inboard beam 250, through CF bearing 256 to yoke 204. The connection between the yoke and the flexure arm does not carry any CF load.

The connection between grip 206 and beam fitting 252 provides a double shear condition between the grip and beam fitting 252 as grip 206 is positioned between outer plate 430 and inner plate 432. The connection between grip 206 and beam fitting 253 also provides a double shear condition between the grip and beam fitting 253 as grip 206 is positioned between outer plate 430 and inner plate 432. The connection of inboard beam assembly 202 to grip 206 at two positions, namely slots 262, 263 provides a double shear condition between the inboard beam assembly and the grip. The double shear condition prevents any rotational moment about the connection of the grip to the inboard beam at each inboard beam plate created by centrifugal forces acting on the rotor blade during blade assembly rotation. The metal material of yoke 204 and inboard beam assembly 202 combined with the double shear condition supplied by the inboard beam plates provide a connection capable of handling the CF load of each rotor blade.

Figure 7:
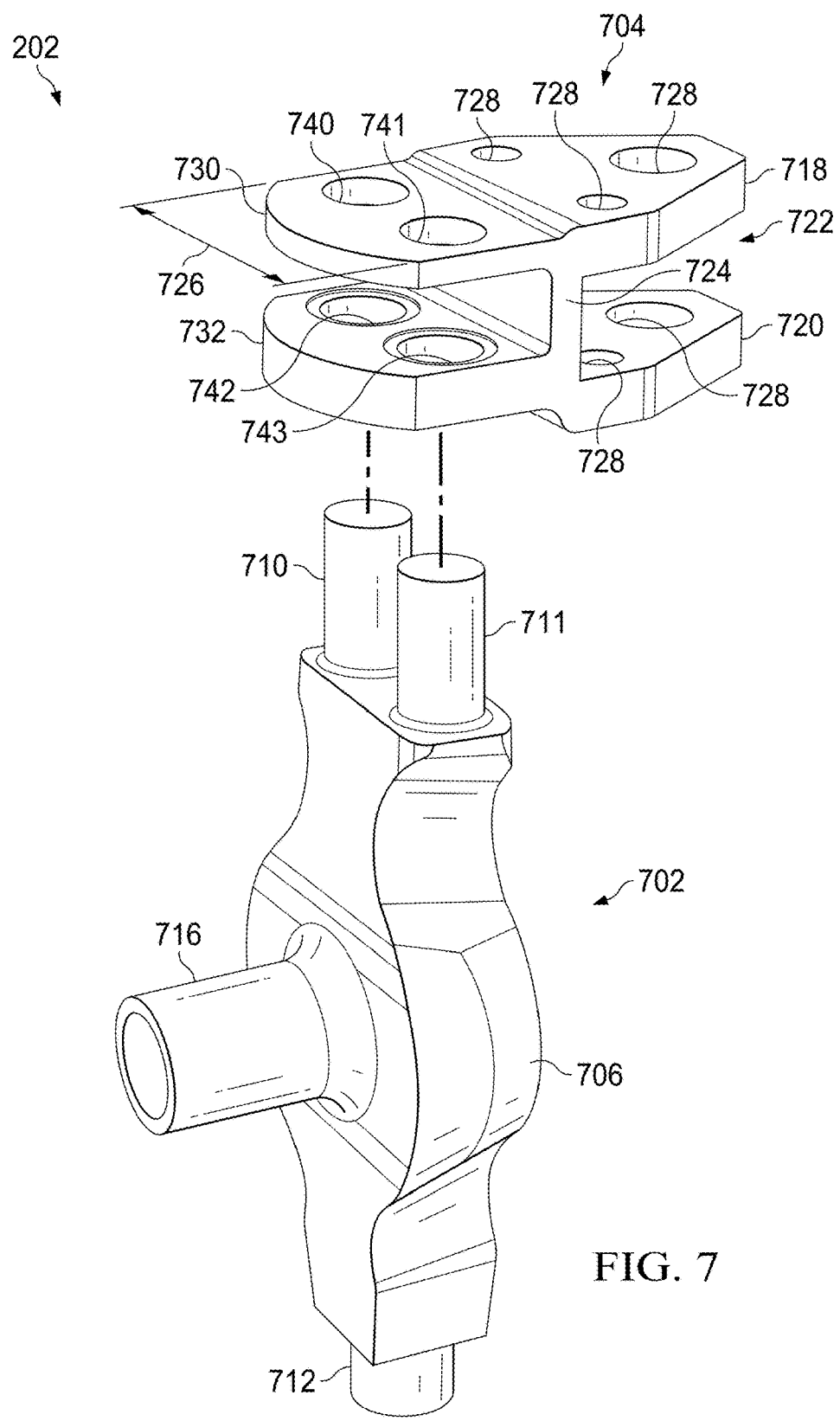
FIG. 7 is an exploded perspective view of an inboard beam assembly according to one or more aspects of the disclosure.
Figure 8:
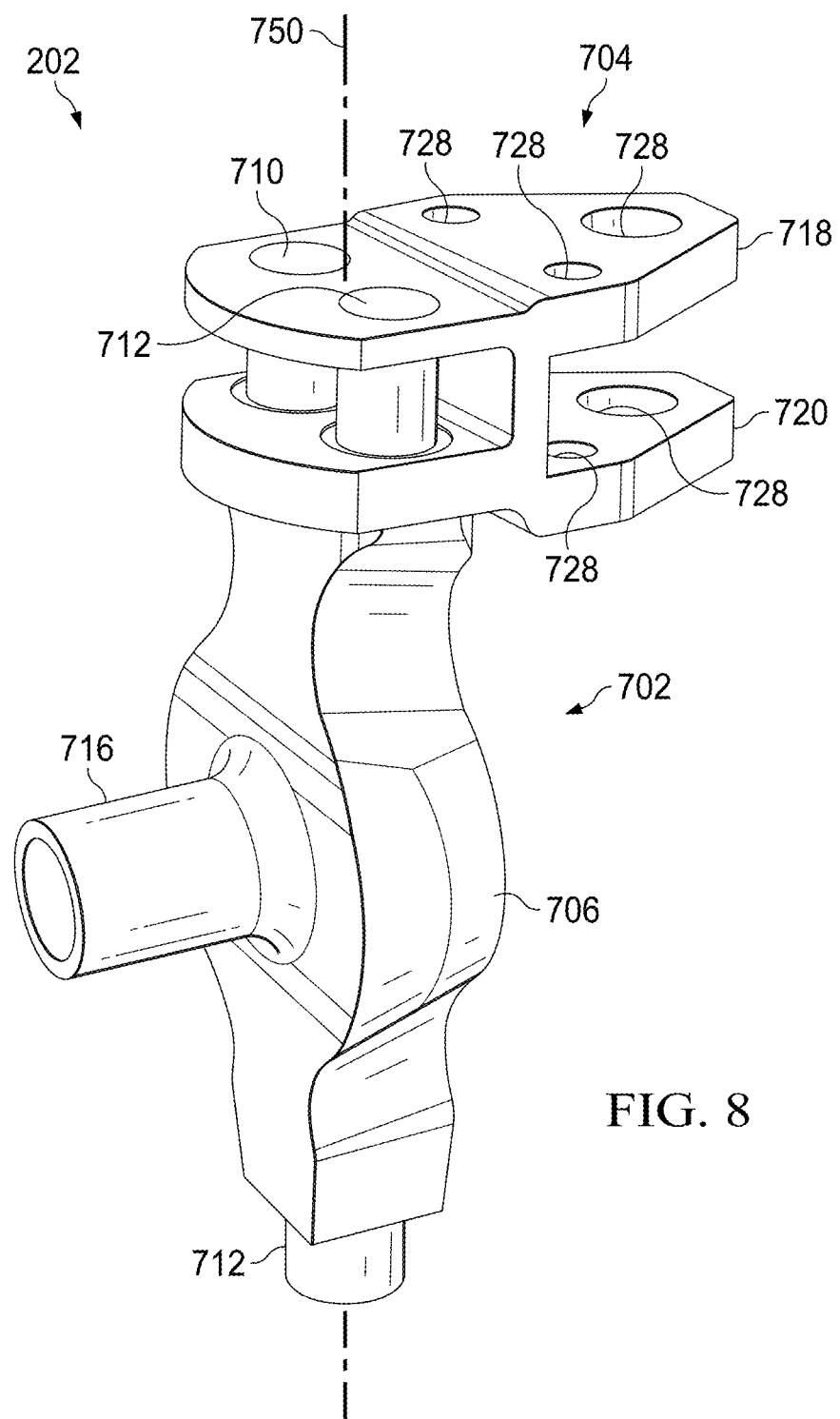
FIG. 8 is a perspective view of an inboard beam assembly according to one or more aspects of the disclosure.

FIGS. 7 and 8 illustrate inboard beam assembly 202 including inboard beam 702 and beam fitting 704. Inboard beam 702 includes posts 710, 711 extending from body 706. Post 712 extends from body 706 opposite posts 710, 711. Post 712 is sized to engage slot 263. Inboard beam 702 includes shaft 716 extending from body 706 toward central aperture 212. Inboard beam 702 includes a cavity having a curved surface concentrically aligned with shaft 716 and positioned on body 706 opposite of shaft 716.

Beam fitting 704 includes outer flange 718 vertically aligned with and spaced from inner flange 720. Space 722 is defined between outer flange 718 and inner flange 720. Space 722 is sized to engage grip 206. Flanges 718, 720 extend from bridge 724. Beam fitting 704 includes width 726. Width 726 is sized to engage slot 262. Mounting holes 728 in flanges 718, 720 are used to attach beam fitting 704 to grip 206. Outer plate 730 and inner plate 732 extend from bridge 724 toward central aperture 212. Outer plate 730 includes anti-rotation apertures 740, 741. Inner plate 732 includes anti-rotation apertures 742, 743. Aperture 740 is axially aligned with aperture 742. Aperture 741 is axially aligned with aperture 743. Apertures 740 and 742 are sized to engage post 710. Apertures 741 and 743 are sized to engage post 711. Optionally, a locking ring (e.g. locking ring 946 in FIG. 9) threadably engaged with a post 710, 711 between outer plate 730 and inner plate 732 may engage inner plate 732 to secure the vertical position of inboard beam 702 relative to beam fitting 704.

The connection of beam fitting 704 to inboard beam 702 via posts 710, 711 through apertures 740, 741, 742, 743 prohibits rotation of inboard beam 702 relative to yoke 204 and grip 206 around central axis 750. The CF load path of a rotor blade attached to grip 206 is from grip 206 to beam fitting 704, to inboard beam 702, through CF bearing 256 to yoke 204.

Figure 9:
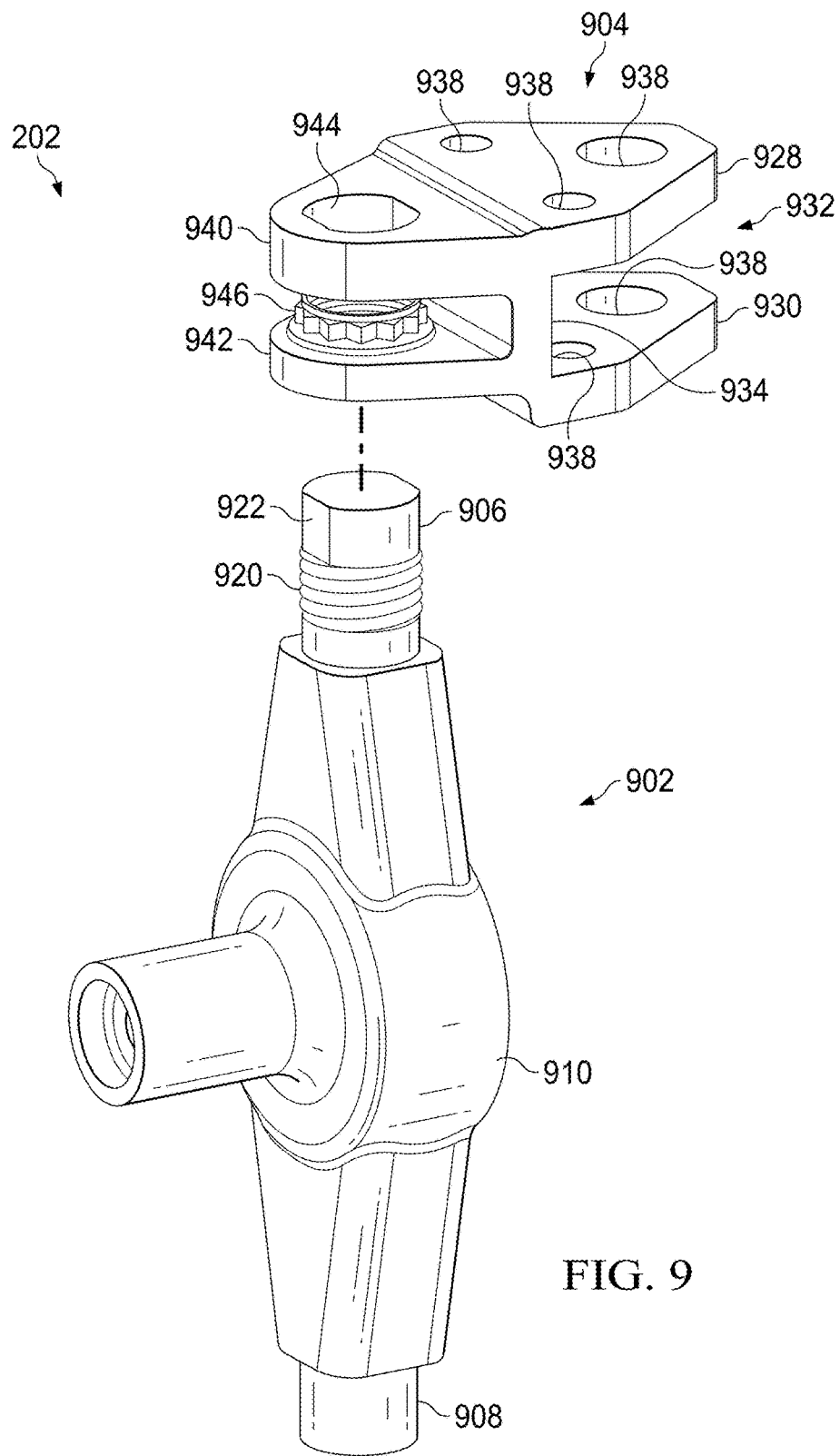
FIG. 9 is an exploded perspective view of an inboard beam assembly according to one or more aspects of the disclosure.
Figure 10:
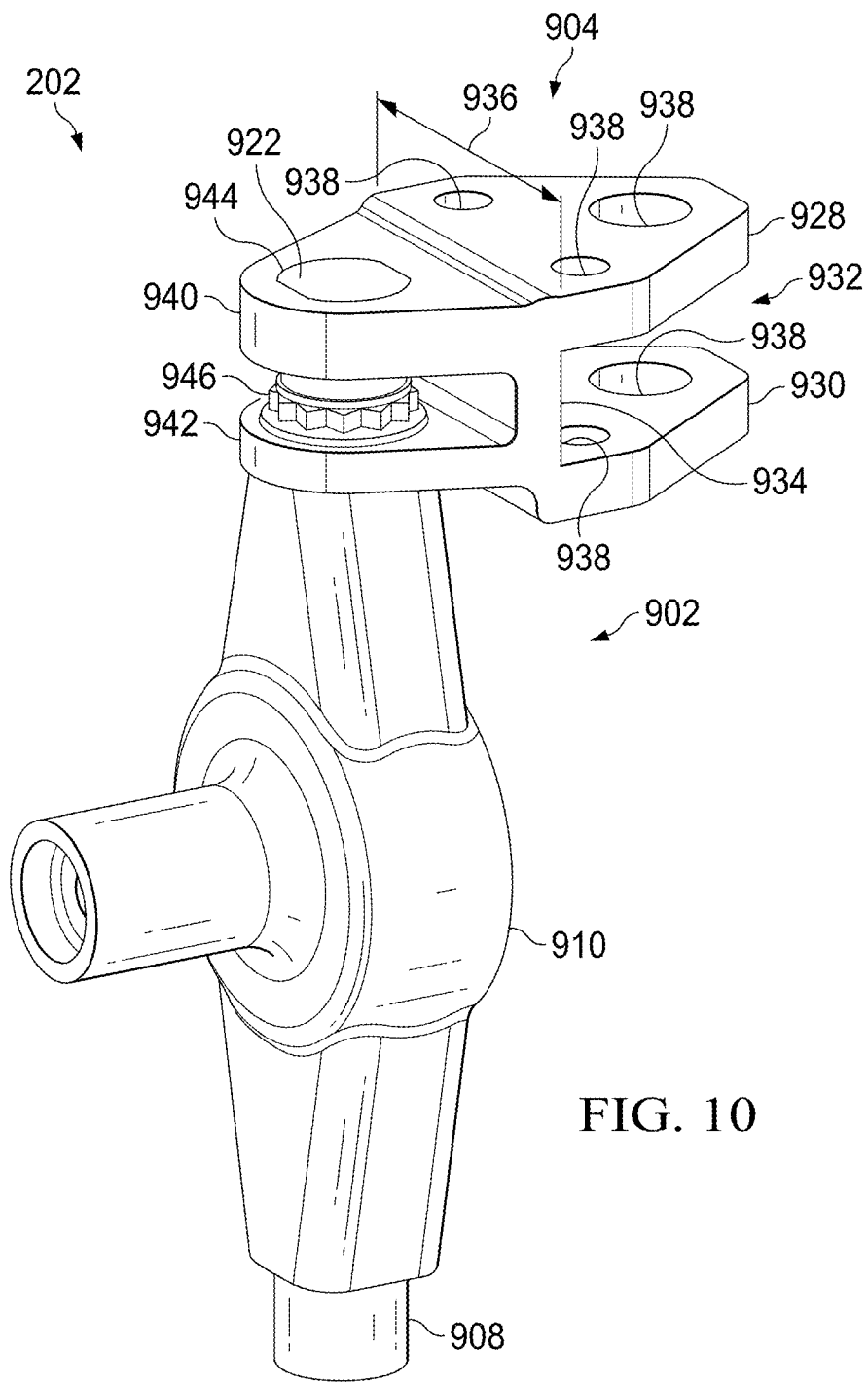
FIG. 10 is a perspective view of an inboard beam assembly according to one or more aspects of the disclosure.

FIGS. 9 and 10 illustrate inboard beam assembly 202 including inboard beam 902 and beam fitting 904. Inboard beam 902 includes posts 906, 908 extending from opposite ends of body 910. Post 906 includes cylindrical threaded section 920 and non-circular section 922. Non-circular section 922 has a cross-section that is non-circular. Post 908 is sized to engage slot 263. Inboard beam 902 includes shaft 912 extending from body 910 toward central aperture 212. Inboard beam 902 includes a cavity having a curved surface concentrically aligned with shaft 912 and positioned on body 910 opposite of shaft 912.

Beam fitting 904 includes outer flange 928 vertically aligned with and spaced from inner flange 930. Space 932 is defined between outer flange 928 and inner flange 930. Space 932 is sized to engage grip 206. Flanges 928, 930 extend from bridge 934. Beam fitting 904 includes width 936. Width 936 is sized to engage slot 262. Mounting holes 938 in flanges 928, 930 are used to attach beam fitting 904 to grip 206. Outer plate 940 and inner plate 942 extend from bridge 934 toward central aperture 212. Outer plate 940 includes non-circular aperture 944. Aperture 944 is shaped to match the non-circular cross-section of non-circular section 922. Locking ring 946 is threadably engaged with threaded section 920 between outer plates 940 and inner plate 942 and may engage inner plate 942 to secure the vertical position of inboard beam 902 relative to beam fitting 904.

The connection of beam fitting 904 to inboard beam 902 via non-circular section 922 within aperture 944 prohibits rotation of inboard beam 902 relative to yoke 204 and grip 206 around central axis 750. The CF load path of a rotor blade attached to grip 206 is from grip 206 to beam fitting 904, to inboard beam 902, through CF bearing 256 to yoke 204.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An inboard bearing assembly for a rotorcraft, comprising:
   an inboard beam including a post;
   a beam fitting, including an outer plate aligned with an inner plate, engaged with the post;
   the beam fitting connected to the inboard beam at an anti-rotational connection, where the inboard beam is prevented from rotation around a central longitudinal axis of the inboard beam relative to the beam fitting; and
   the beam fitting connected to a composite grip between the outer plate and the inner plate, where the post is positioned in a slot formed in the grip.

2. The inboard bearing assembly of claim 1, further comprising a shaft extending from the inboard beam opposite a curved surface in the inboard beam.

3. The inboard bearing assembly of claim 2, further comprising:
   a spindle bearing attached to the shaft; and
   a centrifugal force ("CF") bearing held by the curved surface.

4. The inboard bearing assembly of claim 3, wherein a CF load path is through the composite grip to the beam fitting to the inboard beam to the CF bearing.

5. The inboard bearing assembly of claim 1, further comprising:
   a flange connected between the inboard beam and the post; and
   the anti-rotational connection comprises the inner plate connected to the flange at a plurality of points.

6. The inboard bearing assembly of claim 1, wherein:
   the post is a first anti-rotation post;
   a second anti-rotation post extends from the inboard beam;
   the beam fitting includes a first anti-rotation aperture and a second anti-rotation aperture; and
   wherein the anti-rotational connection includes the first anti-rotation post engaged with the first anti-rotation aperture and the second anti-rotation post engaged with the second anti-rotation aperture.

7. The inboard bearing assembly of claim 1, wherein the anti-rotational connection comprises a non-circular portion of the post secured in a non-circular aperture of the beam fitting.

8. The inboard bearing assembly of claim 7, wherein:
   the post includes a threaded section; and
   a locking ring threadably engaged with the threaded section.

9. A rotor blade assembly of a rotorcraft, comprising:
   a metal yoke including a central aperture;
   a drive shaft connected to the metal yoke at the central aperture;
   a metal yoke arm, formed by the metal yoke, extending radially from the central aperture;
   a beam fitting connected to an inboard beam at an anti-rotational connection;
   a post extending from the inboard beam;
   a centrifugal force ("CF") bearing held by the metal yoke arm and the inboard beam;
   a grip connected to the beam fitting at a double shear connection, wherein the post is positioned in a slot formed in the grip; and
   a CF load path of the rotor blade assembly through the grip, the beam fitting, the inboard beam, the CF bearing, the metal yoke.

10. The rotor blade assembly of claim 9, wherein:
    the beam fitting comprises an outer plate aligned with an inner plate defining a space between the outer plate and the inner plate; and
    the double shear connection comprises the grip positioned in the space and connected to the outer plate and the inner plate.

11. The rotor blade assembly of claim 9, further comprising:
a shaft extending from the inboard beam opposite a curved surface in the inboard beam;
a spindle bearing attached to the shaft; and
the CF bearing held by the curved surface.

12. The rotor blade assembly of claim 9, further comprising a flange connected between the inboard beam and the beam fitting, where the anti-rotational connection connects the beam fitting to the flange at a plurality of points.

13. The rotor blade assembly of claim 9, further comprising:
a second anti-rotation post extending from the inboard beam;
a first anti-rotation aperture in the beam fitting;
a second anti-rotation aperture in the beam fitting; and
wherein the anti-rotational connection comprises the post engaged with the first anti-rotation aperture and the second anti-rotation post engaged with the second anti-rotation aperture.

14. The rotor blade assembly of claim 9,
wherein the anti-rotational connection comprises a non-circular portion of the post secured in a non-circular aperture of the beam fitting.

15. The rotor blade assembly of claim 9, further comprising:
the post extending from the inboard beam through an aperture in the beam fitting;
a threaded section formed in the post; and
a locking ring threadably engaged with the threaded section and engaged with the beam fitting.

16. The rotor blade assembly of claim 9, wherein the beam fitting further comprises:
an outer plate aligned with an inner plate;
a cylindrical hub connecting the outer plate to the inner plate; and
the outer plate connected to the grip and the inner plate connected to the grip, where the grip is positioned between the outer plate and the inner plate.

17. An inboard bearing assembly for a rotorcraft, comprising:
an inboard beam;
a post extending from the inboard beam;
a beam fitting, including an outer plate aligned with an inner plate, engaged with the post;
the beam fitting connected to the inboard beam at an anti-rotational connection, where the inboard beam is prevented from rotation around a central longitudinal axis of the inboard beam relative to the beam fitting;
the beam fitting connected to a grip between the outer plate and the inner plate, where the post is positioned in a slot formed in the grip;
a shaft extending from the inboard beam opposite a curved surface in the inboard beam;
a spindle bearing attached to the shaft;
a centrifugal force ("CF") bearing held by the curved surface; and
a CF load path through the grip, the beam fitting, the inboard beam, and the CF bearing.

18. The inboard bearing assembly of claim 17, further comprising:
a flange connected to the inboard beam and the post; and
the anti-rotational connection comprises the beam fitting connected to the flange at a plurality of points.

19. The inboard bearing assembly of claim 17, further comprising:
a second post extending from the inboard beam;
a first anti-rotational aperture formed in the beam fitting;
a second anti-rotational aperture formed in the beam fitting; and
the anti-rotational connection comprises the post engaged with the first anti-rotational aperture and the second post engaged with the second anti-rotational aperture.

20. The inboard bearing assembly of claim 17, wherein the anti-rotational connection comprises a non-circular portion of the post non-rotationally secured in a non-circular aperture of the beam fitting.

* * * * *